(No Model.)

R. CORRY.
ANEROID BAROMETER.

No. 506,672. Patented Oct. 17, 1893.

Witnesses:
E. N. Sturtevant.
N. Munell

Inventor:
Robert Corry,
by Richardson
atty.

UNITED STATES PATENT OFFICE.

ROBERT CORRY, OF LONDON, ENGLAND.

ANEROID BAROMETER.

SPECIFICATION forming part of Letters Patent No. 506,672, dated October 17, 1893.

Application filed November 12, 1892. Serial No. 451,808. (No model.)

*To all whom it may concern:*

Be it known that I, ROBERT CORRY, a subject of the Queen of Great Britain and Ireland, residing at London, England, have invented an Improvement in Aneroid Barometers, of which the following is a specification.

My invention relates to the ordinary aneroid barometer, and is designed to protect the said aneroids from a tendency to error in their readings and thus to render them more reliable, particularly when used for ascertaining altitudes, or recording depths of mines, pits, &c.

It has been fully proved as the result of exhaustive experiment, that all aneroids when subjected to reduced atmospheric pressures for any length of time, tend to lose on the mercurial barometer, and that this tendency to lose leads to considerable error, and causes the aneroid used in the ordinary way to be of very little value in estimating high altitudes. My invention is designed to avoid these errors, and consists in making the case and glass cover of an ordinary aneroid airtight, or in providing an airtight casing to contain the usual aneroid, the internal atmosphere of which casing may be constantly maintained at a normal pressure when no observation is to be taken, and may be placed in communication with the outer atmosphere only at such times as it is desired to take observations. The diaphragm and apparatus of the aneroid barometer is thus kept at a normal pressure. The diaphragm of the aneroid is only subjected for a very short time to the reduced pressure, so that the conditions are practically the same as obtained when the aneroid was originally tested and graduated under the air pump receiver, and the results should be equally accurate.

In order that my invention may be the better understood I now proceed to describe the same in reference to the drawings hereunto annexed and to the letters marked thereon.

Figure 1:
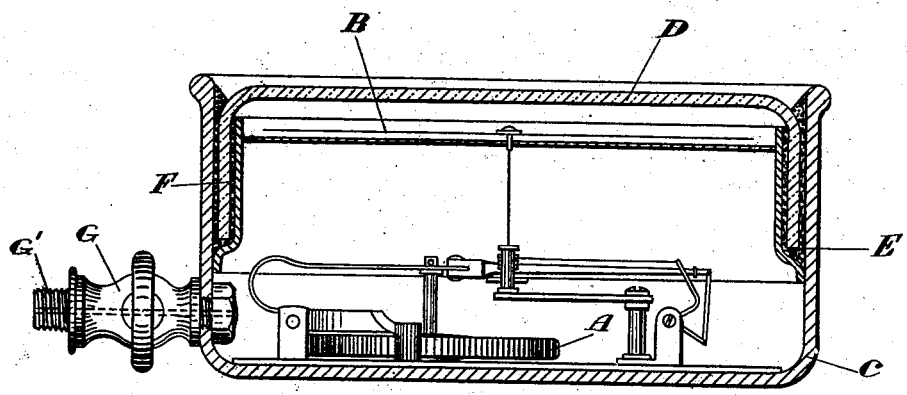
Figure 2:
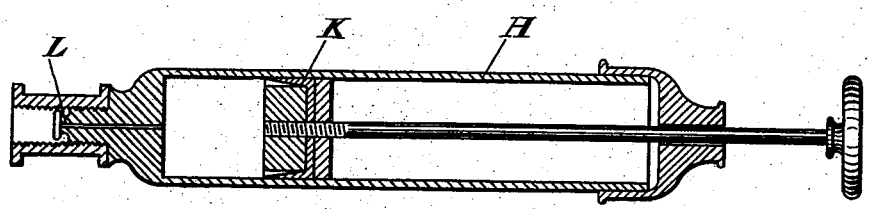

Figure 1 is a section through the hermetically closed case and cock of my aneroid. Fig. 2 is a section through the air force pump used therewith.

A is the usual elastic diaphragm chamber of an ordinary aneroid, which is connected by known mechanism to an ordinary indicating pointer B, whereby the fluctuations of the atmospheric pressure are indicated, when the atmosphere is allowed free access to the space surrounding the said elastic diaphragm A. In carrying out my improvement however I place this known aneroid apparatus within a non-porous and non-permeable case C, and hermetically close this case by a glass cover D, which is adapted to make a specially airtight joint with the case C. This I effect by flanging the glass cover downward at E to a considerable extent, and fixing it by cement into a deep trough F, provided in the case for that purpose, or by any other suitable method. The whole aneroid apparatus is now hermetically sealed from the atmosphere, and the case so constructed has been proved fit to stand a pressure of eight pounds per square inch without leakage. I fix a well fitted cock G of small bore into one side of the said case C, by which the interior of the latter can be placed in free communication with the atmosphere when desired. The outer end of the cock G is provided with a thread G', which enables the air force pump H to be affixed to it, after an observation has been taken. Air is then forced into the case by the action of the pump, which for convenience is provided with a plunger and cup leather K, which also acts as a suction valve on the return stroke. A delivery valve of any approved construction is applied at the nozzle L of the pump, and a convenient form of such valve may be two strips of oiled silk tied over the valve opening in the said nozzle.

The method of using my improved instrument is as follows: Before taking observations as to altitudes, a reading should be taken in comparison with a standard mercurial barometer before starting, say approximately at sea level, and any index error in the instrument should be noted and calibrated. The cock is then closed and the instrument retained at such normal pressure until an observation is required. After such observation, the internal pressure should be raised to the normal by the attachment and working of the air pump. The entry cock should be closed and the apparatus maintained in this condition at all elevations, until a further observation is required.

The air tight case may be adapted to inclose an ordinary aneroid and case, or, as above, may form the only case of the aneroid.

Having now described my invention, what I desire to secure by Letters Patent is—

1. In combination, in an aneroid barometer, the ordinary diaphragm chamber A, the indicating mechanism connected therewith, the airtight casing inclosing the diaphragm and said mechanism, and the cock attached to and carried by the said casing, substantially as described.

2. In an aneroid barometer, a hermetically closed surrounding casing of non permeable material, a cock affixed therein, a glass face thereon, adapted to withstand a pressure of one atmosphere and formed with a flange of considerable depth, bent at right angles to the face, and cemented into a circular trough or recess of the said case, the said flange fitting within the inner side of the casing wall and the said trough being formed within said casing substantially as and for the purposes described.

In testimony whereof I have signed my name to this specification in the presence of two subscribing witnesses.

ROBERT CORRY.

Witnesses:
RICHARD A. HOFFMAN,
CHARLES H. CARTER.